INVENTOR.
Lowell J. Collins
BY Philip A. [Iredell]
Attorney

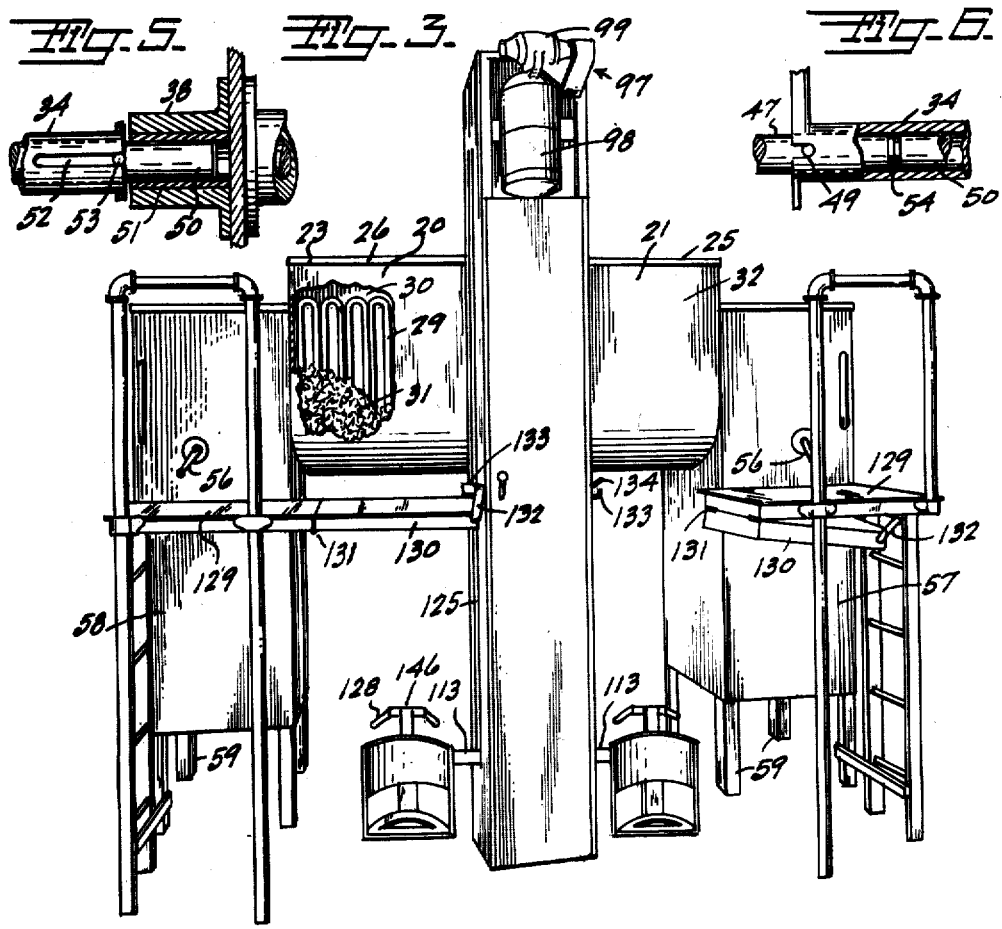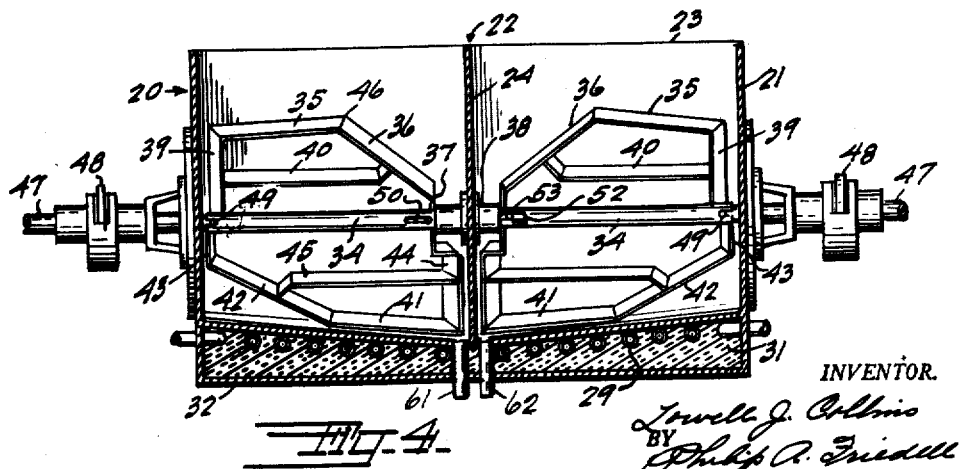

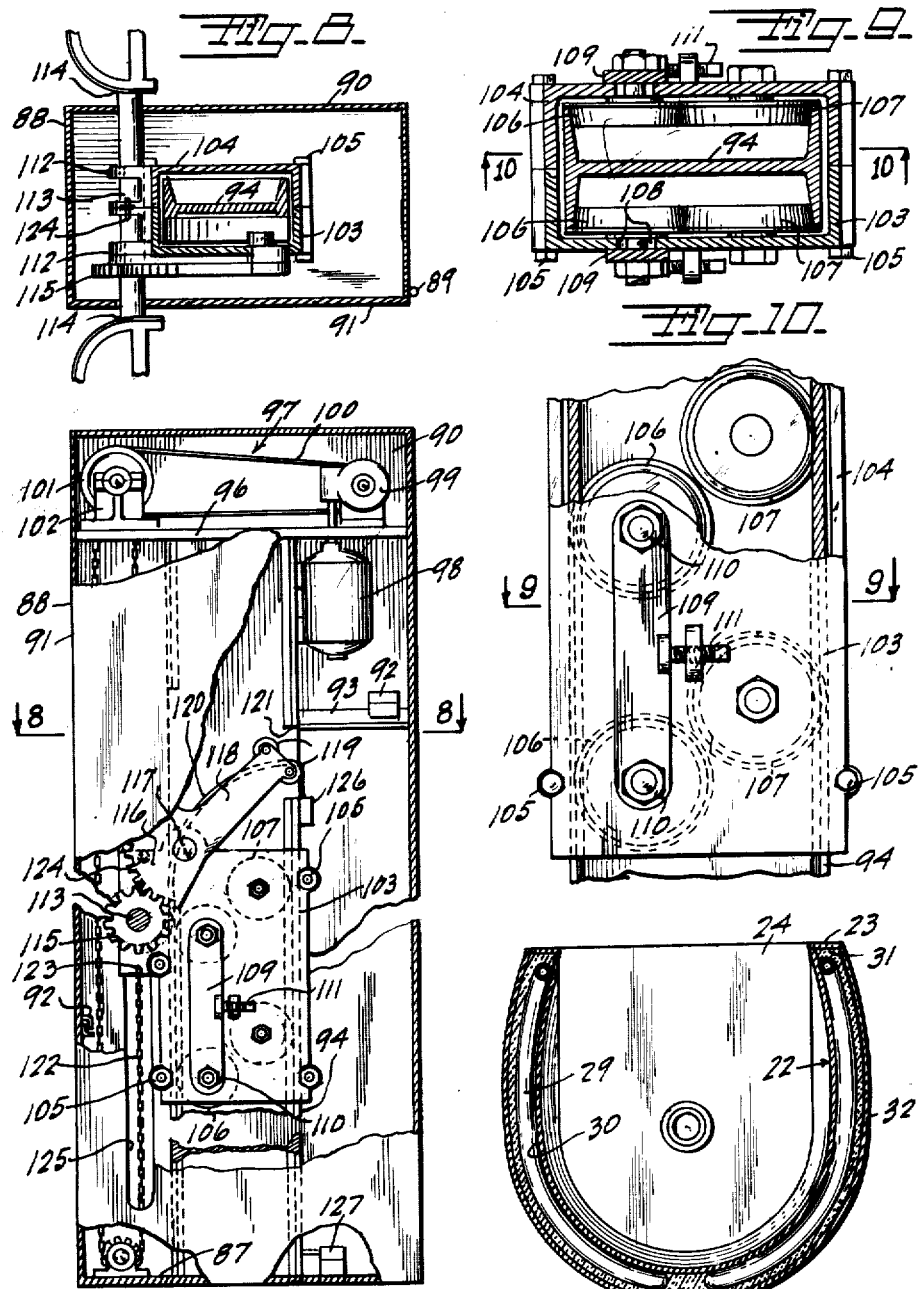

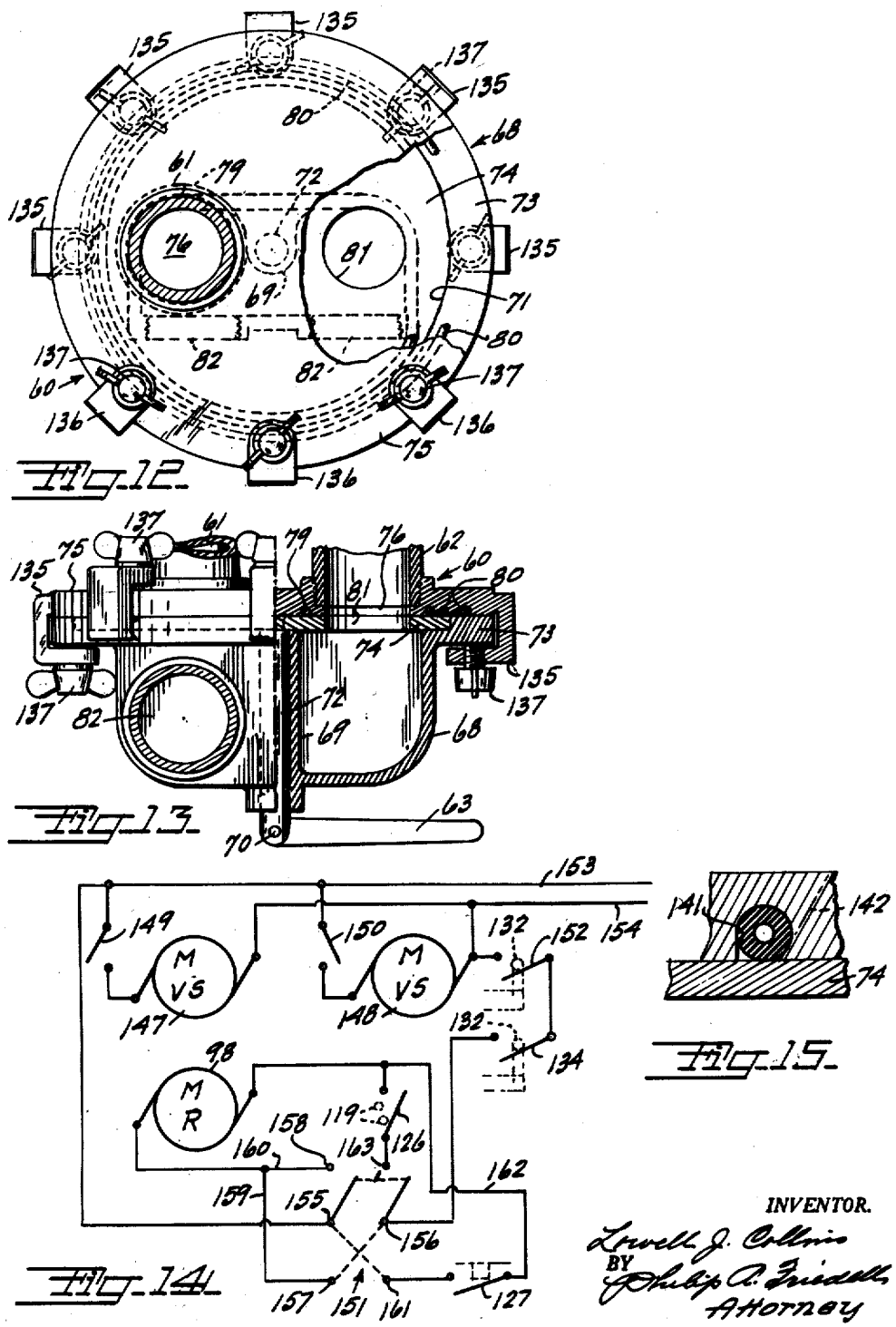

2,846,199

CONTINUOUS PRODUCTION COMBINED FOOD MIXING AND FILLING MACHINE

Lowell J. Collins, Oakland, Calif.

Application January 21, 1955, Serial No. 483,234

12 Claims. (Cl. 259—10)

This invention relates to improvements in means for mixing and for creaming various food products such as cottage cheese, chili, sandwich spreads, and similar products, and provides a machine which does not entrap and mix air into the product, nor does it tend to mash, crush or bruise the various ingredients as is so prevalent in other known types of mixers, thereby resulting in a finer quality and more satisfying mixture, and one which has better keeping qualities with consequent flavor retention because of absence of air in the mixture.

This machine also provides for continuous production because it is a double machine, permitting draw-off from one section to containers while the other section is operating on another batch.

The mixer bowls are mounted in an elevated position each bowl having a discharge from the bottom with both discharges controlled by a single valve for selective discharge through two or more filler spouts into marketing containers supported at a normal working height, thus eliminating the need for a separate filling machine with the attendant time and labor of transfer and cleaning after each batch of food mix.

This machine is also provided with an elevator for elevating and dumping batches of ingredients into the respective bowls, simultaneously or selectively, as may be desired, and also has elevated platforms for manual support for manual attention to the mix and for cleaning the bowls, the plaforms being retractable when the elevator is to be operated and includes circuit making and breaking means, the circuit being broken so that the elevator cannot be operated when the platforms are advanced to support position, and being completed when the platforms are retracted out of obstructional relation to the elevator and the load carried, thus guarding the elevator and containers against damage, and against loss of food mix ingredients.

The objects and advantages of the invention are as follows:

First, to provide a food mixing machine with a pair of coaxial bowls with agitators, and including filler spouts, with the agitators separately driven and selectively controlled for continuous production and discharge of a food mix to marketing containers.

Second, to provide a food mixing machine as outlined in which the mixing bowls are mounted in an elevated position for direct draw-off from the bottoms of the bowls to marketing containers supported at a normal manual working height.

Third, to provide a machine as outlined with an elevator for selective or simultaneous delivery of ingredients to the bowls for mixing, and to provide elevated support platforms for manual attention to the bowls, with the platforms controlling the driving mechanism for the elevator for operation only when the platforms are in a non-obstructive position to the elevator mechanism and containers to eliminate the possibility of damage, loss of food ingredients, and for safety.

Fourth, to provide a machine as outlined in which the bowls are externally jacketed for thermal control of the mix for production of a superior product.

Fifth, to provide a machine as outlined with the coaxial bowls divergent to a common center from the respective ends and provided with a common center wall, and to provide agitators conforming thereto for urging the food mix in the direction of normal gravitational flow toward said common center wall, and with the discharge spouts located substantially at the lowest point adjacent to said common center wall.

Sixth, to provide agitators in which the agitator blades are formed of a relatively thin material of uniform cross-section and relatively wide, and angularly related to the adjacent surfaces of the bowls, to pass into the mix without trapping air, thus providing a product of improved keeping quality and greater delectability.

In describing the invention reference will be had to the accompanying drawings, in which:

Fig. 3 is a rear elevation in perspective with a portion of the outer jacket of one bowl broken away to disclose the thermal control means.

Fig. 4 is a sectional front elevation taken axially through the coaxial bowls and showing the angular thin blade agitators, thermal control means, and the retractable shafts for removal of the agitators at will.

Fig. 5 shows one of the center agitator shaft bearings in vertical section and the retractable agitator shaft.

Fig. 6 is a fragmentary view showing the cooperation between the retractable agitator shaft and the retractable drive shaft for retaining the agitator shaft in position within the center bearing.

Fig. 7 is a side elevation of the elevator with portions of the side wall broken away and parts in section to disclose the elevator mechanism and controls.

Fig. 8 is a section taken on line 8—8 of Fig. 7.

Fig. 9 is a section taken on line 9—9 of Fig. 10, and drawn to an enlarged scale with the housing removed.

Fig. 10 is a front elevation of Fig. 9, with the upper portion of the wall broken away and the guide beam cut back to disclose the rollers and is taken on a line 10—10 of Fig. 9 for that broken away portion.

Fig. 11 is a transverse sectional elevation through one bowl and viewed from just inside of the center partition toward the end in Fig. 4, with the agitator removed to disclose the convergence of the bowl from the center partition to the end and showing the thermal jacket.

Fig. 12 is a top plan view of the selective valve for controlling discharge from the respective bowls and with part of the head broken away to disclose the valve disc, and is drawn to an enlarged scale.

Fig. 13 is a front elevation of the valve with one side shown in section.

Fig. 14 is a wiring diagram showing the controls for the agitators and the elevator.

Fig. 15 is a greatly enlarged section illustrating the O-ring grooves for the valve.

Figure 1:
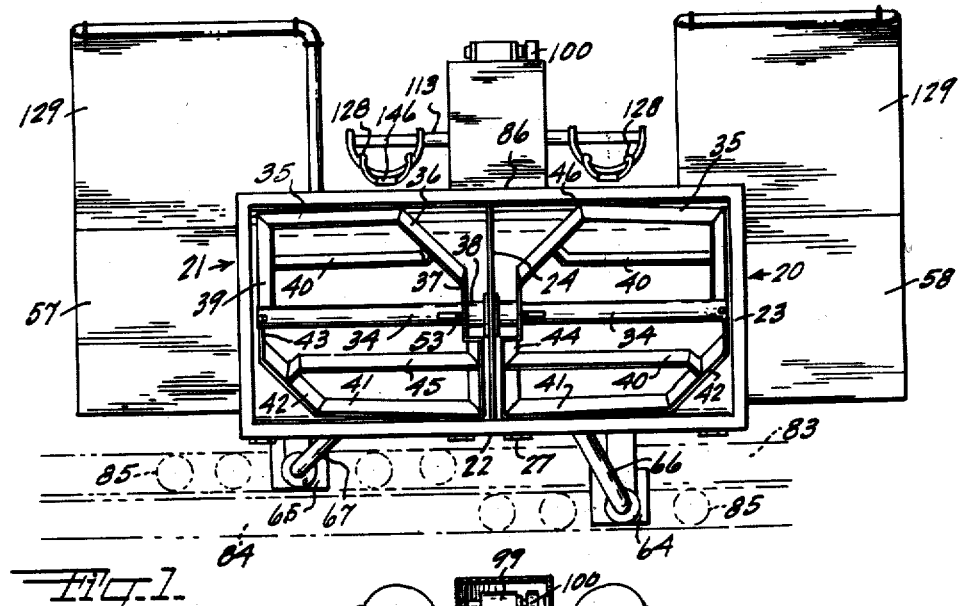
Fig. 1 is a top plan view of the invention.

The invention includes two coaxial bowls 20 and 21 both of which taper outwardly or diverge from the end to the center 22, and with the center portion semi-cylindrical and thence converging upwardly to the same width at the top as they are at the ends as is clearly illustrated in Fig. 11, the top frame 23 being rectangular in plan. This form causes movement of the food mix toward the center partition 24 which divides the structure into two isolated compartments for selective or simultaneous operation of the two mixers.

Each of the bowls is provided with a cover as indicated at 25 and 26, these covers being hinged to the front flange as indicated at 27.

These bowls are provided with individual thermal controls including the fluid circulating tubing 29 which is in contact with the inner wall 30 of the bowl and exteriorly covered with insulation 31, the tubing and insulation being sealed in by the outer jacket 32. A suitable pump 33 is provided for each bowl for circulating the fluid which may be cooled or heated by any suitable means.

The agitator consists of a tubular shaft 34, and an assembly of blades each blade being formed of a flat strip of metal or the like about ⅜ inch thick and 3 to 4 inches wide and having rounded side edges, and all set at angles of about 45 degrees to a plane common with the plane of travel and consisting of the outer members 35 which are intermediately bent down toward the axis as indicated at 36, and terminating in a right-angled portion 37 to clear the center bearing 38, the other end being fixed to the radial member 39. An intermediate blade 40 connects between the radial member 39 and the angular portion 36. The other or opposite portion of the agitator is formed reversely, the member 41, 42 being the reverse of 35, 36 with the blade 45 disposed oppositely to 40, the end portion 43 being similar to 37, while the end 44 is inset to clear the bearing 38 and operate close to the center partition, with all portions of the blades clearing the walls of the bowl during operation.

The member 35 operates close to the wall of the bowl, up to the bend line at 46, with 41 taking over to operate from that intermediate point to the center partition, the blade 36 moving excess from the center wall while 42 returns it toward the center wall, and the enlargement of the bowl to the center wall causes coincident gravitational flow toward the center partition.

The bearings include, for the drive end, a suitable retractable shaft and bearing combination, such as the type illustrated and which consists of the drive shaft 47 which is retractable by means of the bushing controlled by the nut 48 for retraction and advance, and which type is covered by my Patent No. 2,576,575, issued November 27, 1951, or the type disclosed in my copending application Serial No. 399,300, filed December 21, 1953, and which has matured into Patent No. 2,723,110, issued November 8, 1955, for Sanitary Bearing and Shaft Combination may be used, each type including a suitable engaging connection such as the bayonet type 49, providing a driving connection as also a support for that end of the agitator.

The other end of the agitator is supported by a second or idle shaft 50 which is rotatable in a bearing bushing 51 and slidable in the tubular agitator shaft 34, the end of this tubular shaft being slotted as indicated at 52 for the pin 53 which is fixed in the shaft and by which the shaft is manually advanced into and retracted from the bearing. However, the shaft 50 cannot be retracted unless the shaft 47 is first retracted, as this latter shaft engages the idle shaft as indicated at 54 in Fig. 6, the idle shaft having substantially the same length as the tubular agitator shaft and being slidable therein, therefore, when the drive shaft is advanced, it prevents the idle shaft from working out of the center bearing.

Figure 2:
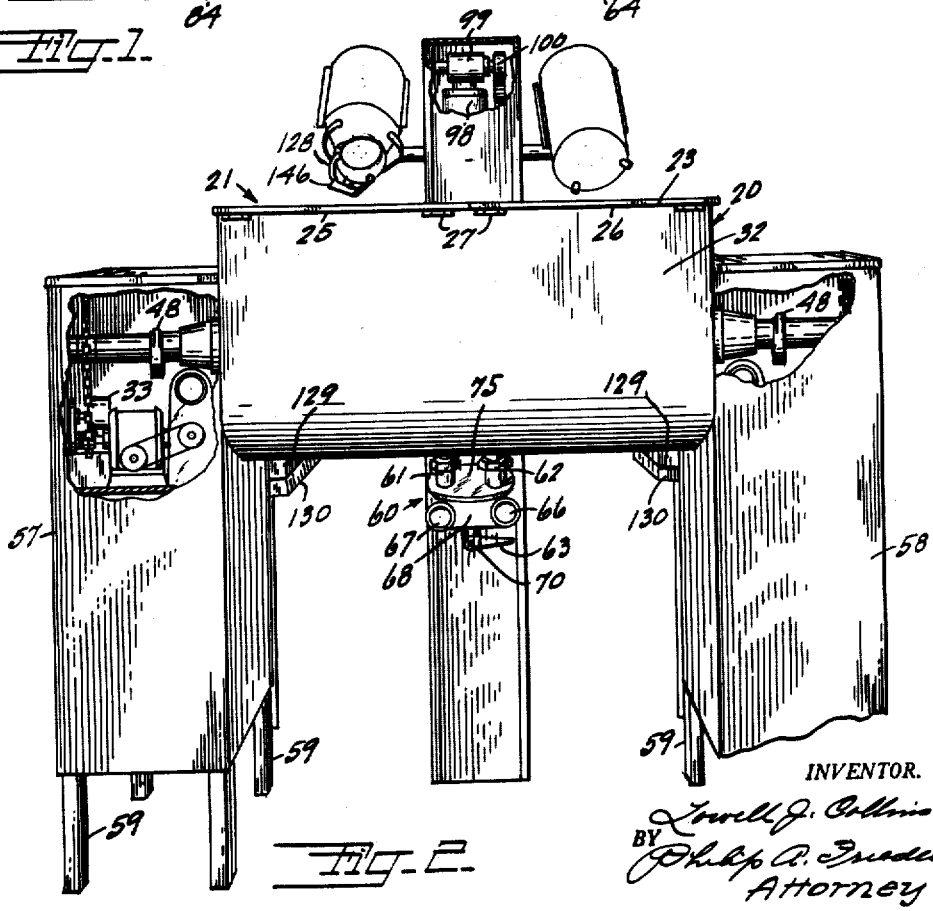
Fig. 2 is a front elevation in perspective with portions of the walls broken away to disclose driving means.

Each bowl has its own drive and control as indicated in Fig. 2 with the control indicated at 56 in Fig. 3 for controlling operation and speed of the agitator, the drive mechanism being housed in the standards 57 and 58 between and by which the double bowl is supported in an elevated position, the lower ends of the standards being supported on the legs 59.

Each of the bowls is provided with a discharge spout which opens into the bottom close to the center partition and which is the lowest point in the bowl, for gravity flow, these discharge spouts communicating with a single valve 60 as indicated at 61 and 62. This valve is controlled by a lever 63 which, when in a central position closes both discharge spouts. By turning the lever 63 to the position shown in Fig. 2, the mix in bowl 20 discharges through the dispensing spouts manually controlled through the heads 64 and 65, for filling the containers. If the lever is turned to the opposite position, the mix in bowl 21 is discharged through these filler spouts 66 and 67, thus permitting processing in one bowl while marketing containers are being filled from the other bowl, providing for continuous processing and dispensing.

This dispensing valve 60 is illustrated in enlarged views in Figs. 12 and 13 and consists of a housing 68 having a bearing 69 extending vertically therethrough, and a bore is provided therein for the control shaft 72 which terminates in a hand lever 63 which is hinged thereto as indicated at 70, this hand lever having a diameter slightly less than the shaft so that it can be withdrawn through the bore with the shaft for quick disassembly for cleaning. The upper end of this control shaft 72 is fixed to the valve disc 74 which is set in a counterbore 71 formed in the top of the housing and in which the disc is rotatable, the housing having an annular flange 73.

A head 75 is formed coextensive with the flange 73 and has two spaced passages 76 formed therethrough and including connecting means for the respective discharge spouts 61 and 62 of the respective bowls. Sealing means consists of an O-ring 79 set in a groove in the head and surrounding each passage 76, and another O-ring 80 is located close to the peripheral edge of the disc, these O-rings cooperating with the top surface of the disc, and between the head and flange.

The disc 74 has a single passage 81 for selective discharge from the respective bowls, and for closing off both discharges when required.

The housing has a plurality of outlets to which the filler spouts 66 and 67 are connectable at will, the outlets being sealable by means of a suitable cap when any filler spout is not to be used. Conveyors 83 and 84 are located at normal working height of about 30 inches for transporting the marketing containers 85 to and from the filler spouts.

An elevator is formed as a part of this machine and is located in the rear of the machine and connected centrally of the bowls as indicated at 86, and consists of a housing having front, back and side walls, and a base 87, the front wall 88 being fixed to the bowls while the back wall is hinged to form a door as indicated at 89, and the side walls 90 and 91 are provided with inside angle clips 92 so that they can be lifted off and replaced at will, being supported by the transverse angles 93.

The guide member for the elevator consists of a structural I-beam 94 having its lower end fixed to the base 87 and provided with a head plate 96 at its upper end to provide a support for the drive means 97, shown as consisting of a motor 98 operating through a worm gear reduction 99 which in turn drives through a suitable drive combination such as a belt and pulley 100, 101, the pulley 101 being rotatably supported in bearings 102.

The traveling carrier consists of a housing formed of two cooperative parts 103 and 104 which are bolted together as indicated at 105, and this housing is provided with rollers 106 and 107 for each cooperative part of the housing, these rollers being tapered as indicated in Figs. 9 and 10 to conform to the taper of the flanges of the I-beam so as to maintain suitable alignment of the carrier on the I-beam. The rollers 106 are adjustable to compensate for differences in spacing of the flanges, and for this adjustment, the rollers 106 for each side are supported by a bar 109 as indicated at 110, the bar being adjustable by means of the screw 111, the housing being suitably slotted as indicated at 108 to permit this adjustment, the nuts 110 being tightened after the adjustment has been made.

This carrier housing is provided with a set of bearings 112 for the cradle shaft 113 on which the can cradles are fixed as indicated at 114, this shaft having a pinion 115 fixed thereon and which pinion meshes with a sector gear 116 which is mounted on a stub shaft 117.

This sector gear has an integral lever 118 provided with with rollers 119 which straddle a portion 120 of the I-beam flange which is curved rearwardly to the other flange and extending through a passage 121 formed by removal of a portion of the said other flange.

The carrier is elevated and lowered by means of the chain 122 the ends of which are fixed to the carrier at 123 and 124. Vertical slots 125 are formed through the side walls for vertical travel of the carrier shaft, and travel limiting switches 126 and 127 limit the up-travel and down-travel of the carrier.

The can cradles are provided with grips 128 for securing the cans during the dumping operation.

As the carrier is elevated it eventually reaches the location of the curved portion of the flange at 120, the rollers 119 follow the curved flange causing the sector gear 116 to rotate the pinion 115 and consequently the carrier shaft 113, inverting the cans as indicated in Fig. 2, emptying the contents into the selective or respective bowls, since either or both sides or carrier cradles may be used.

A platform is provided on each side of the elevator, each consisting of a fixed portion 129 and a retractive portion 130 which is indicated as hinged at 131, the retractive portion having a bail type support 132 at its free end to engage over a hook type support 133 on the elevator side wall. A normally closed switch is located in cooperative relation to the support 132 for engagement when the support 132 is hooked into the support 133 for breaking the circuit and indicated at 134, one of these switches being provided for each retractive portion of the platform. The circuit is broken to the elevator motor so that the elevator cannot be operated if either of the retractive portions are not retracted to clear the cradles and cans.

The valve is quickly and easily cleaned as it can be detached from the head and discharge spouts and disassembled in an absolute minimum of time, and just as quickly re-assembled and attached ready for operation, the securing means consisting of L-shaped overhanging clamps, the clamps 135 being integral with the head, and 136 being integral with the housing flange, though ordinary C-clamps can be used, though with consequent loss of time and increased labor cost and complication. These clamps are provided with thumb screws 137. By merely loosening these screws, the housing with the valve mechanism can be slid forward for removal. The valve and control shaft can be removed without any type of uncoupling or disconnection.

The O-rings are set in grooves 141 which are restricted as indicated in Fig. 15 to retain the rings in place when the housing is disassembled from the head, the outer wall converging downwardly toward the axis of the housing as indicated by the indicator line 142, and for reactance of the O-ring against the sliding movement of the valve disc 74.

The cradles for the cans are made to suit the type of cans to be handled, with the head clamp 146 vertically adjustable for engaging over the tops of the cans.

As indicated by the wiring diagram Fig. 14, there is a separate motor, 147 and 148, for each bowl, with a variable speed range of about 4 to 20 R. P. M. for driving the agitators, the minimum speed being used for maintaining the ingredients of the food mix in suspension during discharge, with other most desirable speeds being used for the various food mixes. The two motors are separately controlled by the switches 149 and 150, the speed being controlled by the levers 56 shown in Fig. 3.

The elevator is under multiple control; manual control through the reversing switch 151 which is under control of the other switches, including the switches 134 and 152 which are connected in series and which are controlled by the retractive portions 130 of the platforms through the bail-type supports 132. In addition there are two travel limiting switches, 126 and 127, respectively breaking the circuit at the upper and lower limits of travel of the carrier.

Thus it is impossible to operate the elevator if either or both of the retractive portions of the platform are not retracted to clear the cradles. The elevator cannot overtravel in either direction. If the platform controlled switches are both closed, the elevator can be operated in reverse through the manual switch when the circuit is broken by one of the travel limiting switches.

Thus the circuits for the respective bowls are respectively from the power supply line 153, switch 149, motor 147, to the other side, and, from one side 153 through switch 150, motor 148, to the other side 154 of the power supply.

The elevator circuit connects from one side 153 of the power supply to one center terminal 155 of the reversing switch 151, while the other side 154 of the power supply is connected through the platform controlled switches 134 and 152 to the other center terminal 156.

The opposed terminals 157 and 158 are connected in parallel through the leads 159 and 160 to one side of the elevator motor 98, while the other side of the motor is connectable through two circuits, respectively through the one terminal 161 of the reversing switch through the normally closed down travel limiting switch 127, thence to the other side of the motor through the lead 162, and, from reversing switch terminal 163 through the up-travel limiting switch 126 to lead 162. In any case, if either switch 134 or 152 is open, the motor 98 cannot be operated.

Thus, a food mixing and creaming machine is provided which is capable of continuous output, and from which the product can be dispensed directly to marketing containers, without transfer to a separate filling machine; in which the mixers are elevated sufficiently for gravitational discharge to containers supported at a normal manual working height, and in which the agitators are formed for minimum entrapment of air with a minimum of breaking, bruising or mashing of curd or other ingredients, in which the agitators are easily removable for cleaning, with the bowls having a common discharge control valve for selective discharge and which valve is easily disconnected, disassembled, cleaned, re-assembled and re-connected for a thorough cleaning operation, and an elevator for elevating and dumping the ingredients into the respective bowls at will and controlled against any mishap through safety controls.

I claim:

1. A food mixer, in combination, a mixing bowl having an end wall and a center partition, a housing for each end of the bowl and supporting said bowl in an elevated position, an agitator in said mixing bowl and having a tubular hub extending throughout its axial length, driving means including a drive shaft for said agitator and housed within one of said housings, a first bearing fixed to the inside of the center partition and having one end sealed by said center partition, a passage formed through said end wall and a second bearing projecting through said passage and fixed to said end wall, said drive shaft being slidably and rotatably operable in said second bearing with one end advanceable into said tubular hub and including engaging means for engagement with said tubular hub for driving the agitator, a support shaft slidable within said tubular hub and having one end cooperative with the said one end of said drive shaft and with the other end advanceable into said first bearing for support of one end of said agitator and with said drive shaft maintaining said support shaft against retraction when said drive shaft is in driving position, and means for manually advancing and retracting said drive shaft, and second means for manually advancing and retracting said support shaft with said support shaft being retractable following retraction of said drive shaft for freeing the agitator for removal from the bowl.

2. A mixing bowl divergently formed from each end to the center for drainage and for working food mix to said center and having a central partition forming two coaxial compartments isolated from each other and including an agitator for each compartment and individual driving means and control means for each agitator, a housing for each end of said mixing bowl and having said driving means housed therein, a discharge spout for each compartment and located adjacent to said central partition, a valve housing having both of said discharge spouts coupled to the top thereof and having two dispensing outlets through the front thereof, and a manually controlled valve member movable to three positions and having a single passage for selective dispensing from the respective discharge spouts to said valve housing for dispensing through said dispensing spouts and for sealing off both discharge spouts during processing of food mix, at will.

3. A structure as defined in claim 2; an elevator including driving means including a motor and a circuit therefor and having a can cradle for each compartment of said mixing bowl for carrying cans to deliver material to the mixing bowl, and said elevator having a housing having walls, an elevated platform for manual support for access to the mixing bowl and including retractive portions having each a free end including engaging means and movable to obstructive position for said can cradles said walls including support members cooperative with said free ends for supporting the free ends of said retractive portions and including a normally closed switch cooperative with said engaging means and opened through application of the engaging means on said support members, said elevator driving means including said normally closed switch for breaking circuit for non-operativeness of said elevator when said retractive portions are in obstructive relation to the cradle for prevention of damage or injury.

4. A food mixer comprising a bowl having a central partition forming two coaxial isolated bowls, a housing fixed to each end of said bowl, an agitator for each of said bowls, an end bearing mounted on each side of said partition, each agitator having a hollow shaft, a drive shaft engageable with one end of said hollow shaft for support and driving of the agitator and including a bearing having means for retracting said drive shaft from said one end at will, a cylindrical shaft slidable in said hollow shaft and projectable from the other end of said hollow shaft for support in the end bearing and including means for manually projecting and retracting said cylindrical shaft for release of the agitator for removal at will, said cylindrical shaft being cooperative with the inner end of the drive shaft and being projected into and retained in said end bearing through projection of said drive shaft into driving engagement with the hollow shaft.

5. A food mixer comprising a pair of spaced housings forming standards, a mixing bowl having a drive end and a support end and a bottom and a dispensing spout issuing from the bottom, said mixing bowl being supported at its respective ends by said housings in an elevated position, an agitator for said mixing bowl and having a hollow shaft, and driving means in one of said housings and control means therefor for said agitator and including a drive shaft having one end insertible in one end of said hollow shaft and having engaging means cooperative with mating engaging means on said hollow shaft for driving said agitator, a bearing mounted on the drive end of said mixing bowl with said drive shaft rotatable and retractable in said bearing, a support shaft slidable within said hollow shaft with its inner end cooperative with said one end of said drive shaft when said drive shaft is advanced to driving position, an end bearing for the outer end of said support shaft with said support shaft advanced into said bearing when said drive shaft is advanced to driving position for the agitator, and manually operable means for advancing and retracting said drive shaft, and second manually operable means for advancing and retracting said support shaft with said support shaft retractable from said end bearing when said drive shaft is retracted for releasing said agitator for removal from the mixing bowl.

6. A food mixer comprising a pair of spaced housings forming standards, a mixing bowl having a dispensing spout issuing from the bottom, said mixing bowl being supported at its respective ends by said housings in an elevated position with the bottom of the bowl and dispensing spout in gravity discharging position, an agitator in said bowl, and driving means in one of said housings and control means therefor for said agitator; an elevated platform for manual support for access to the interior of said mixing bowl for cleaning and inspection purposes and including a retractive portion, containers for ingredients, an elevator for elevating said containers of ingredients for a food mix for discharge into the bowl and having a housing, with said retractive portion and said housing having cooperative support means for support of the retractive portion, said elevator including driving means including a motor and a circuit therefor, and including a normally closed switch supported by the elevator housing and cooperative with the support means on the retractive portion for breaking said circuit when the retractive portion is supported, and for freeing the switch for completing its portion of the circuit when the retractive portion is retracted to non-obstructional relation to the containers for ingredients during elevating and lowering.

7. A food mixer in combination, two housings, a mixing bowl having its respective ends supported by and between said housings on a horizontal axis and having a central partition forming two coaxial isolated bowls, a drive shaft bearing on each of the respective ends, and an agitator for each bowl, and individual driving means in each housing and control means therefor for each agitator, each agitator having a hollow shaft, said bowls each having a discharge spout issuing from the bottom, each driving means including for one end of the agitator a retractable drive shaft having engaging means for cooperation with said one end of said hollow shaft and including a terminal end insertible in said one end of said hollow shaft, and a support shaft slidable within said hollow shaft and cooperative with said terminal end, and an end bearing on each side of said central partition with the projected support shaft slidable and rotatable therein, manually operable means for advancing said support shafts into said end bearings, manually operable means for advancing and retracting said drive shaft to and from driving position with said drive shaft maintaining said support shaft against retraction from the end bearing when the drive shaft is in driving position and freeing said support shaft for retraction when the drive shaft is retracted, containers for ingredients and an elevator for elevating said containers for ingredients and including inverting means for dumping the contents of the elevated containers for ingredients in the respective bowls at will.

8. A structure as defined in claim 7; said bowls having the lower portion increasing in diameter from their outer ends to said central partition for gravity flow to said center partition, and a valve having both discharge spouts connected to the top thereof and having a dispensing housing having a front wall having two outlets, said valve having a valve disc manually movable to three positions for selectively sealing off both discharge spouts, and for discharge from either discharge spout to said dispensing housing at will.

9. A mixing bowl having a central partition forming two coaxial bowls, and a discharge spout for each coaxial bowl, a valve including a head having said discharge spouts connected thereto, a housing having a flange and comprising a dispensing housing, a valve disc seated in a counterbore formed in the top of said dispensing housing and having a valve shaft cooperative therewith and depending through a bearing formed in said dispensing housing and terminating in a lever not exceeding the diameter of said valve shaft and hinged thereto for withdrawal of the valve disc and the shaft and lever combination for cleaning without requiring disassembly, and providing means for manually moving said valve disc to three selective positions.

10. A structure as defined in claim 9; said head peripherally conforming to said flange and having a first set of spaced depending L-clamps fixed to one side of the periphery of the head and projecting under the flange on said housing and each having a screw for cooperation with the underside of said flange, and a second set of L-clamps fixed to the opposite edge of said flange and projecting upwardly and over said head, and a screw for each clamp of said second set to cooperate with the top surface of said head, whereby loosening of the screws frees the housing for lateral removal from the head.

11. A food mixer comprising two coaxial bowls having a common center wall, an agitator for each bowl and each having a hollow shaft, a bearing passing through each end wall, and an end bearing on each side of said center wall, a drive shaft for each agitator and retractable at will in each end wall bearing and having its terminal end insertible in one end of the hollow shaft and in inserted position cooperating with said hollow shaft for driving the agitator and for support of one end thereof, and a support shaft slidable within said hollow shaft and projectable from the other end of the agitator into the end bearing for rotational support of the other end of the agitator, and with the other end of said support shaft cooperative with the drive shaft for retention in said end bearing when said drive shaft is in driving position, said support shaft including manual retracting means for retraction for release of the agitator for removal from the bowl only when said drive shaft is retracted.

12. A food mixer, in combination, two spaced housings, two mixing bowls in axial alignment and having a common center wall and each having an end wall and a bottom discharge, with the end walls fixed to said housings with the bottoms of the bowls in a plane in spaced relation above the supporting surface for the housings for gravity dispensing of the products through said discharge spouts to a normal working height, an agitator for each bowl and driving means and control means therefor for each bowl, with the driving means for the respective agitators housed in the respective housings, an elevator and driving means and control means therefor and having container supporting means for each bowl for elevating containers to a plane above the bowls and including inverting means operative during the terminal portion of up-travel for dumping the contents of the containers into said bowls and including reversing means for righting said containers during the initial portion of down-travel; said elevator having a housing having walls, a working platform supported in an elevated position for manual support for access to the interiors of the mixing bowls and including a retractable portion having the terminal end supportable by one of said walls, support means on said one of said walls with the free end of said retractable portion supportable by said support means, said driving means for said elevator including a motor and a circuit therefor including a normally closed switch cooperative between said support means and said retractable portion for breaking said circuit when said free end is supported by said support means, said retractable portion being in obstructive relation to said container supporting means when supported by said support means, with said switch operating as a safety device against damage or injury with the elevator operable only when said retractable portion is retracted.

References Cited in the file of this patent

UNITED STATES PATENTS

| | | |
|---|---|---|
| 43,154 | Heneage | June 14, 1864 |
| 257,789 | Venable | May 9, 1882 |
| 1,492,675 | Clark et al. | May 6, 1924 |
| 1,829,066 | Shelton | Oct. 27, 1931 |
| 2,576,575 | Collins | Nov. 27, 1951 |